US010339777B2

(12) United States Patent
VanBlon et al.

(10) Patent No.: US 10,339,777 B2
(45) Date of Patent: Jul. 2, 2019

(54) IDENTIFYING AN INDIVIDUAL BASED ON AN ELECTRONIC SIGNATURE

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/377,177

(22) Filed: Dec. 13, 2016

(65) Prior Publication Data

US 2018/0165935 A1 Jun. 14, 2018

(51) Int. Cl.
| | |
|---|---|
| G06F 21/32 | (2013.01) |
| G08B 13/24 | (2006.01) |
| G08B 15/00 | (2006.01) |
| H04W 76/11 | (2018.01) |
| G08B 13/00 | (2006.01) |
| H04L 29/08 | (2006.01) |
| G06F 21/35 | (2013.01) |
| H04W 4/029 | (2018.01) |
| H04W 4/80 | (2018.01) |
| H04W 4/02 | (2018.01) |

(52) U.S. Cl.
CPC ......... *G08B 13/2494* (2013.01); *G06F 21/32* (2013.01); *G06F 21/35* (2013.01); *G08B 13/00* (2013.01); *G08B 15/00* (2013.01); *G08B 15/004* (2013.01); *H04L 67/18* (2013.01); *H04L 67/22* (2013.01); *H04W 4/029* (2018.02); *H04W 76/11* (2018.02); *G06F 2221/2111* (2013.01); *G06F 2221/2151* (2013.01); *H04L 67/12* (2013.01); *H04L 67/26* (2013.01); *H04W 4/02* (2013.01); *H04W 4/80* (2018.02)

(58) Field of Classification Search
CPC ... G08B 13/2494; G08B 15/004; H04L 67/26; H04W 4/008; H04W 76/021; G06F 2221/2111; G06F 2221/2151
USPC ........................................................ 340/541
See application file for complete search history.

(56) References Cited

U.S. PATENT DOCUMENTS

| | | | | |
|---|---|---|---|---|
| 9,501,773 B2 * | 11/2016 | Dai | ........................ | G06Q 20/40 |
| 2003/0105725 A1 * | 6/2003 | Hoffman | .................. | G06F 21/32 |
| | | | | 705/75 |
| 2003/0138135 A1 * | 7/2003 | Chung | ............... | G06K 7/10346 |
| | | | | 382/119 |
| 2006/0212520 A1 * | 9/2006 | Logue | ..................... | H04L 51/12 |
| | | | | 709/206 |

(Continued)

FOREIGN PATENT DOCUMENTS

WO      WO 0135349 A1 *   5/2001          G06K 9/00

*Primary Examiner* — Hai Phan
*Assistant Examiner* — Anthony D Afrifa-Kyei
(74) *Attorney, Agent, or Firm* — Kunzler Bean & Adamson (57) ABSTRACT

Apparatuses, methods, systems, and program products are disclosed for identifying and individual based on an electronic signature. A method includes detecting an individual based on input from one or more sensors. The method also includes determining an electronic signature associated with the detected individual. The method further includes reporting the determined electronic signature in response to determining that the detected individual is an unknown individual.

12 Claims, 6 Drawing Sheets

(56) References Cited

U.S. PATENT DOCUMENTS

| | | | |
|---|---|---|---|
| 2008/0098456 A1* | 4/2008 | Alward | G06F 21/316 |
| | | | 726/1 |
| 2009/0189736 A1* | 7/2009 | Hayashi | G06F 21/32 |
| | | | 340/5.81 |
| 2015/0350233 A1* | 12/2015 | Baxley | H04W 4/90 |
| | | | 726/1 |
| 2016/0248765 A1* | 8/2016 | Saxena | H04L 63/0861 |

* cited by examiner

IDENTIFYING AN INDIVIDUAL BASED ON AN ELECTRONIC SIGNATURE

FIELD

The subject matter disclosed herein relates to security and more particularly relates to identifying an individual based on an electronic signature.

BACKGROUND

Security systems can detect the presence of an individual at a location. The individual is an unauthorized individual if the individual cannot provide authorized identifying information to the security system. Some security systems can determine the identity of an individual based on images of the individual, the individual's clothing, the individual's vehicle, etc. If a clear image is not captured, however, this often results in not being able to identify the individual.

BRIEF SUMMARY

An apparatus for identifying an individual based on an electronic signature is disclosed. A method and computer program product also perform the functions of the apparatus. In one embodiment, an apparatus includes one or more sensors, a processor, and a memory that stores code executable by the processor. In certain embodiments, the code is executable by the processor to detect an individual based on input from the one or more sensors. In one embodiment, the code is executable by the processor to determine an electronic signature associated with the detected individual. In another embodiment, the code is executable by the processor to report the determined electronic signature in response to determining that the detected individual is an unknown individual.

In some embodiments, the code is further executable by the processor to detect and report a plurality of electronic signatures associated with the individual. In certain embodiments, at least a portion of the plurality of electronic signatures uniquely identifies the individual. In some embodiments, the one or more sensors are associated with a security system that performs one or more security actions in response to determining that the individual is an unknown individual.

In various embodiments, the code is further executable by the processor to report the electronic signature to one or more different devices. In one embodiment, the code is further executable by the processor to notify the one or more different devices to look for and report the determined electronic signature of the unknown individual in response to detecting the electronic signature. In a further embodiment, the code is further executable by the processor to query the one or more different devices to determine whether the electronic signature of the unknown individual is associated with a known individual.

In some embodiments, the code is further executable by the processor to send a notification to a user associated with the one or more sensors and receive confirmation from the user that the determined electronic signature of the unknown individual is associated with a known individual. In certain embodiments, the code is further executable by the processor to report a location for the individual and a timestamp for when the individual was detected.

In one embodiment, the one or more sensors comprises a camera that is used to capture one or more images of the individual. The one or more images may be used to determine one of the electronic signature of the individual and an identity of the individual. In some embodiments, the code is further executable by the processor to report the determined electronic signature to one or more law enforcement agencies.

In one embodiment, the code is further executable by the processor to receive a request to detect a reported electronic signature, determine a location for the detected electronic signature, and report the location for the detected electronic signature.

In some embodiments, the code is further executable by the processor to disregard the determined electronic signature in response to determining that the individual is a known individual. In various embodiments, the electronic signature comprises a wireless signature that includes an identifier selected from the group consisting of a media access control ("MAC") address, a Bluetooth® identifier, and a device identifier.

A method, in one embodiment, includes detecting, by a processor, an individual based on input from one or more sensors. The method, in a further embodiment, includes determining an electronic signature associated with the detected individual. The method, in some embodiments, includes reporting the determined electronic signature in response to determining that the detected individual is an unknown individual.

In one embodiment, the method further includes detecting and reporting a plurality of electronic signatures associated with the individual. In certain embodiments, at least a portion of the plurality of electronic signatures uniquely identifies the individual. In a further embodiment, the method includes reporting the electronic signature to one or more different devices.

In some embodiments, the method includes notifying the one or more different devices to look for and report the determined electronic signature of the unknown individual in response to detecting the electronic signature. In various embodiments, the method includes querying the one or more different devices to determine whether the electronic signature of the unknown individual is associated with a known individual.

In some embodiments, the method includes receiving a request to detect a reported electronic signature, determine a location for the detected electronic signature, and report the location for the detected electronic signature.

A program product, in one embodiment, includes a computer readable storage medium that stores code executable by a processor. In some embodiments, the executable code includes code to perform detecting an individual based on input from one or more sensors. The executable code, in a further embodiment, includes code to perform determining an electronic signature associated with the detected individual. The executable code, in some embodiments, includes code to perform reporting the determined electronic signature in response to determining that the detected individual is an unknown individual.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
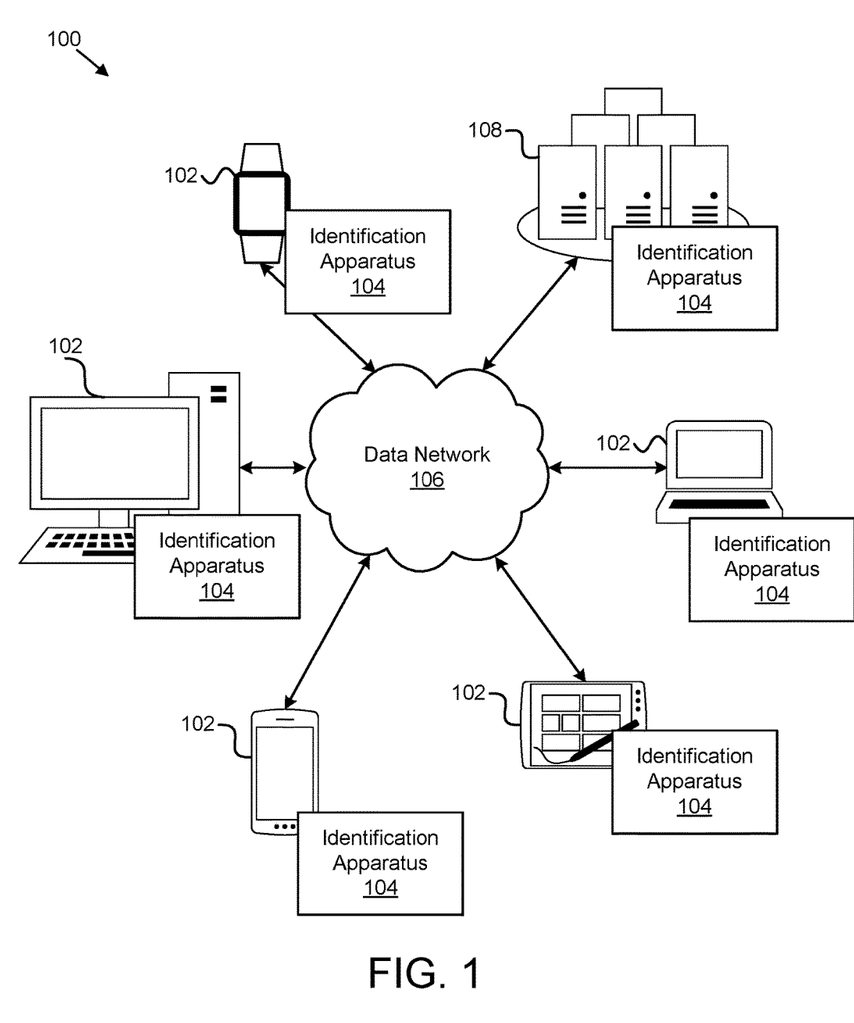
FIG. 1 is a schematic block diagram illustrating one embodiment of a system for identifying an individual based on an electronic signature.

FIG. 1 is a schematic block diagram illustrating one embodiment of a system 100 for identifying an individual based on an electronic signature. In one embodiment, the system 100 includes one or more information handling devices 102, one or more identification apparatuses 104, one or more data networks 106, and one or more servers 108. In certain embodiments, even though a specific number of information handling devices 102, identification apparatuses 104, data networks 106, and servers 108 are depicted in FIG. 1, one of skill in the art will recognize, in light of this disclosure, that any number of information handling devices 102, identification apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more sensors for detecting individuals, faces, movements, sounds, vibrations, and/or the like. In some embodiments, the information handling devices 102 include digital cameras for capturing videos and/or still photography. In a further embodiment, the information handling devices 102 includes sensors for detecting electronic signatures, such as wireless signatures, emitted from a different information handling devices 102 e.g., Wi-Fi signal identifiers, media access control ("MAC") addresses, Bluetooth® addresses, near-field communication ("NFC") addresses, device identifiers, and/or the like.

In one embodiment, the identification apparatus 104 is configured to detect an individual based on input from one or more sensors, determine an electronic signature associated with the detected individual, and report the determined electronic signature in response to determining that the detected individual is an unknown individual. The identification apparatus 104, including its various sub-modules, may be located on one or more information handling devices 102 in the system 100, one or more servers 108, one or more network devices, one or more security systems, and/or the like. The identification apparatus 104 is described in more detail below with reference to FIGS. 2 and 3.

In one embodiment, the identification apparatus 104 improves the functionality and/or usability of the computer, computing technology, computing environment, or the like, by detecting an unknown individual, associating one or more electronic signatures with the unknown individual, and then reporting the electronic signatures to other devices or authorities so that the electronic signatures can be tracked. For example, an intruder may have a smart phone that can be identified by a wireless signature. When the identification apparatus 104 for a security system detects the intruder's presence and determines that the intruder is an unknown individual, the identification apparatus 104 may detect the smart phone's Bluetooth® signature, and share it with other security systems or devices so that the intruder's location can be tracked when his Bluetooth® signature is detected by the identification apparatus 104 at a different location.

In various embodiments, the identification apparatus 104 may be embodied as a hardware appliance that can be installed or deployed on an information handling device 102, such as a security system, on a server 108, or elsewhere on the data network 106. In certain embodiments, the identification apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the identification apparatus 104 may include a power interface, a wired and/or wireless network interface, a graphical interface that attaches to a display, and/or a semiconductor integrated circuit device as described below, configured to perform the functions described herein with regard to the identification apparatus 104.

The identification apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the identification apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the identification apparatus 104.

The semiconductor integrated circuit device or other hardware appliance of the identification apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the identification apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. For example, a server 108 may store facial recognition images, electronic signatures, and/or the like.

Figure 2:
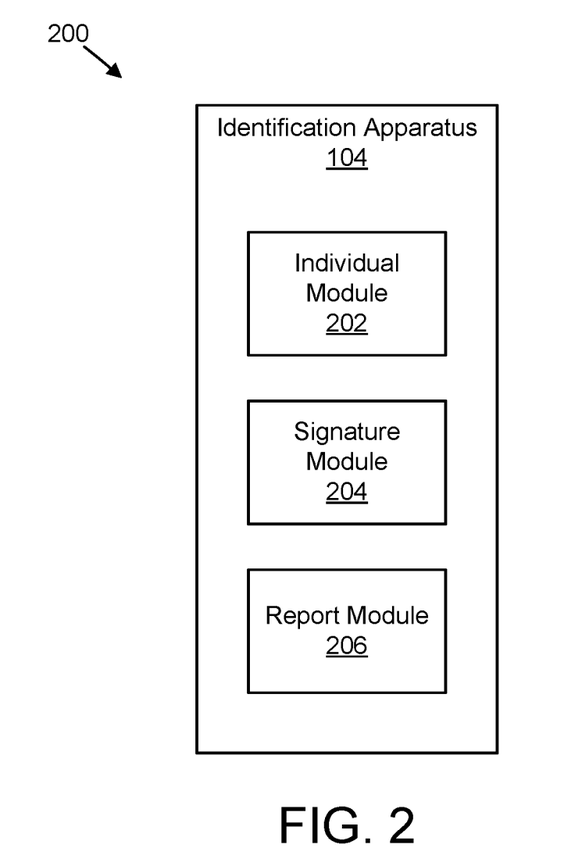
FIG. 2 is a schematic block diagram illustrating one embodiment of an apparatus for identifying an individual based on an electronic signature.

FIG. 2 is a schematic block diagram illustrating one embodiment of an apparatus 200 for identifying an individual based on an electronic signature. In one embodiment, the apparatus 200 includes an embodiment of an identification apparatus 104. The identification apparatus 104, in some embodiments, includes one or more of an individual module 202, a signature module 204, and a report module 206, which are described in more detail below.

In one embodiment, the individual module 202 detects an individual based on input from one or more sensors. As described above, the one or more sensors may include cameras, motion sensors, proximity sensors, and/or the like. The one or more sensors may be communicatively coupled to various devices such as mobile devices, security systems, closed-circuit television systems, or the like. The one or more sensors, or a device communicatively coupled to the one or more sensors, may be configured to detect or determine when an individual is within a sensing proximity of the sensors.

When the presence of the individual is sensed, the individual module 202 may attempt to determine an identity of the individual, e.g., the individual module 202 may attempt to determine whether the individual is a known or an unknown individual. The individual module 202, in one embodiment, may use facial recognition and an image of the individual's face captured with a camera to determine whether the individual is on a list of known individuals.

The individual module 202 may determine that an individual is an unknown individual, in another embodiment, based on the time and or day in which the individual was detected. For example, if a home is typically empty during the day, and the individual is detected in the middle of the day, the individual module 202 may presume that the individual is an intruder or some other unknown individual. In a further example, if a family has programmed their security system to be active while they are on vacation for a week, and the individual module 202 detects an individual in the home during the week the family is gone, the individual module 202 may presume that the individual is an intruder or some other unknown individual.

The individual module 202 may also attempt to establish an identity of the individual based on the electronic signature of a device associated with the detected individual. The signature module 204, in one embodiment, determines an electronic signature associated with the detected individual. The electronic signature may include a wireless signature, such as a unique Wi-Fi signal identifier, a MAC address, a Bluetooth® identifier, an NFC identifier, an infrared ("IR") identifier, a device identifier, and/or the like. Other electronic signatures may include electromagnetic radiation readings, or the like. One of skill in the art, in light of this disclosure, will recognize one or more sensors that may be used to detect an electronic signature or signal.

If the individual module 202 only detects a single individual, then the signature module 204 may conclude that each detected electronic signature belongs to that individual. However, if multiple different individuals are present, the signature module 204 may detect a plurality of various electronic signatures, only a subset of which belong to a particular individual. Thus, the signature module 204 associates each of the detected electronic signatures with a particular individual, whether they belong to the individual or not. In such an embodiment, at least a subset of the various electronic signatures uniquely identifies a detected individual. For example, the combination of an electronic signature for a smart phone and a smart watch may identify a particular individual who carries the smart phone and wears the smart watch.

As discussed in more detail below, the electronic signatures may be shared with other devices or security systems such that the actual electronic signatures associated with the individual's devices may be determined based on the individual's presence being detected at different locations, and the electronic signatures at each location correlating to or matching the electronic signatures found at other locations. For example, a burglar may be detected at store A; however, multiple people may be in the store at the same time that the burglar is robbing the store such that the signature module 204 determines multiple different electronic signatures at store A's location. The detected electronic signatures may be shared with other security systems or devices within a vicinity of store A. A few hours later, two of the electronic signatures that the signature module 204 detected at store A are detected at store B that is fifty miles from store A, and a couple hours later at store C that is seventy-five miles from store A. In this manner, an electronic signature can be monitored, traced, tracked, etc., in order to find and track one or more individuals even if the individual's identity is unknown.

The signature module 204 may track and/or store the determined electronic signatures in a database or other data store for future reference. The signature module 204 may also reference previously stored electronic signatures to determine whether any of the currently determined electronic signatures match the previously stored electronic signatures. For example, the signature module 204 may eliminate some of the currently determined electronic signatures from being associated with an individual if the electronic signatures are found on a known individual/device list, a known electronic signature list, an approved individual/device list, an approved electronic signature list, and/or the like. In some embodiments, if an electronic signature can't be determined, the signature module 204 may reference the electronic signature database using an image or video of the individual to determine a previously stored electronic signature associated with the individual and/or an identity of the individual.

In one embodiment, the signature module 204 queries one or more different devices or systems, such as security systems, to determine whether an electronic signature is a known or approved electronic signature. For example, the signature module 204 for a security system may query a security system for a neighboring location to determine whether the neighboring second security recognizes a particular electronic signature. Similarly, the signature module 204 may query a networked data store, such as a cloud data store, that contains multiple approved electronic signatures to determine whether a determined electronic signature is an approved electronic signature.

The report module 206, in one embodiment, reports the determined electronic signatures associated with the detected individual in response to determining that the detected individual is an unknown individual. The report module 206, for instance, may report the electronic signatures to a law enforcement agency so that the law enforcement agency has a record of when and where the electronic signatures were determined. In some embodiments, the report module 206 reports the electronic signatures to one or more other devices or systems, such as to other security systems installed at different locations, to the owner of the security system that detected the individual, and/or the like. The report module 206 may report the electronic signatures over a data network 106 to each of the law enforcement agencies, security systems, other devices, and/or the like.

The report module 206, in one embodiment, reports additional information associated with a detected individual in addition to the electronic signature information. For example, the report module 206 may send one or more images or videos of the individual that are captured using a camera. In another example, the report module 206 may send location information, e.g., global positioning system ("GPS") data, an address, or the like. In a further example, the report module 206 may send a timestamp of when the individual was detected, a time period for how long the individual was detected at the location, a timestamp of when the individual left the location, and/or the like.

Figure 3:
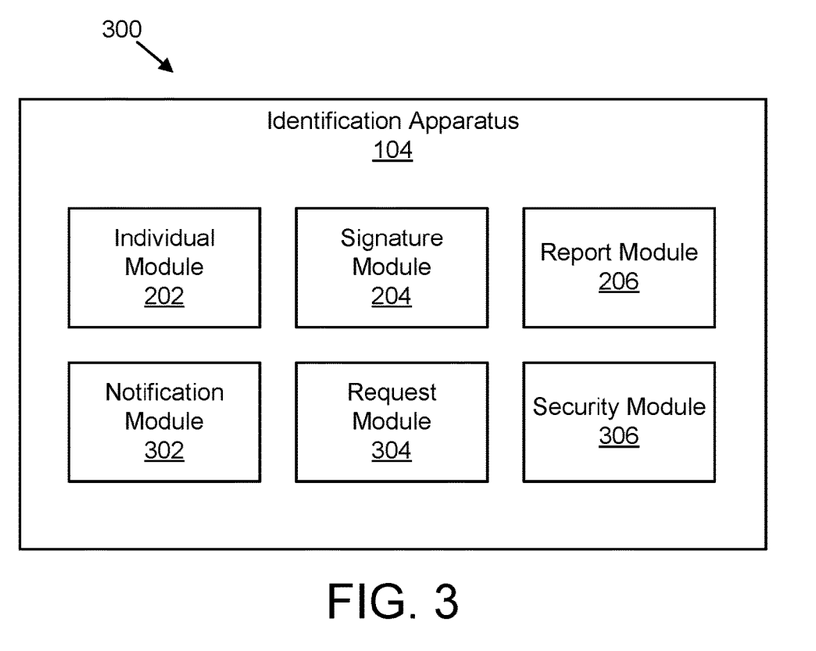
FIG. 3 is a schematic block diagram illustrating one embodiment of another apparatus for identifying an individual based on an electronic signature.

FIG. 3 is a schematic block diagram illustrating one embodiment of an apparatus 300 for identifying an individual based on an electronic signature. In one embodiment, the apparatus 300 includes an embodiment of an identification apparatus 104. The identification apparatus 104, in some embodiments, includes one or more of an individual module 202, a signature module 204, and a report module 206, which are substantially similar to the individual module 202, the signature module 204, and the report module 206 described above with reference to FIG. 2. In a further embodiment, the identification apparatus 104 includes one or more of a notification module 302, a request module 304, and a security module 306, which are described in more detail below.

The notification module 302, in one embodiment, sends a notification associated with the detection of an individual and/or a determination of one or more electronic signatures. The notification module 302, in one embodiment, notifies one or more different devices, such as one or more other security systems, to look for and report an electronic signature that is associated with the unknown individual. For example, if the signature module 204 detects a MAC address AA:BB:CC:DD:EE:FF when the unknown individual is detected, the notification module 302 may notify one or more other devices, e.g., smart phones, or systems, e.g., security systems, to be on the lookout for this particular MAC address. In this manner, the individual can be tracked across different locations based on an electronic signature associated with the individual by sharing the electronic signature, and other identifying information, with various devices and systems that can detect electronic signatures.

The notification module 302, in another example, may send an electronic message, e.g., a text message, an email message, and/or the like, or a voice message, to a registered user of a security system to alert them to the detection of an unknown individual, an unknown electronic signature, and/or the like. The notification module 302 may also prompt the user for confirmation regarding whether the unidentified individual or electronic signature is a known or unknown individual/electronic signature. If unknown, the notification module 302 may trigger the report module 206 to report information about the individual/electronic signature; otherwise, if the user confirms that the individual/electronic signature is known or approved, then the signature module 204 may disregard the electronic signature.

The request module 304, in one embodiment, receives a request to detect, look for, track, or the like a reported electronic signature, e.g., an electronic signature that was determined by a different device. If the request module 304 detects the requested electronic signature, the request module 304 may determine a location of the detected electronic signature and report the location for the electronic signature. For example, the request module 304 may report the location of the detected electronic signature back to the device that requested the detection of the electronic signature, to one or more law enforcement agencies, to one or more different devices, to one or more users, and/or the like. In this manner, a location of an electronic signature, and consequently a location of an individual associated with the electronic signature, can be tracked, traced, or the like using various different networked devices.

The security module 306, in one embodiment, performs one or more security actions in response to the individual module 202 and/or the signature module 204 determining that the individual is an unknown individual. The one or more security actions may include turning on lights, sounding an alarm, notifying authorities, locking windows/doors, and/or the like. Thus, in addition to reporting information about the unknown individual, e.g., reporting one or more wireless signatures, the identification module 104 can proactively act by increasing security at a location where an unknown individual is detected.

Figure 4:
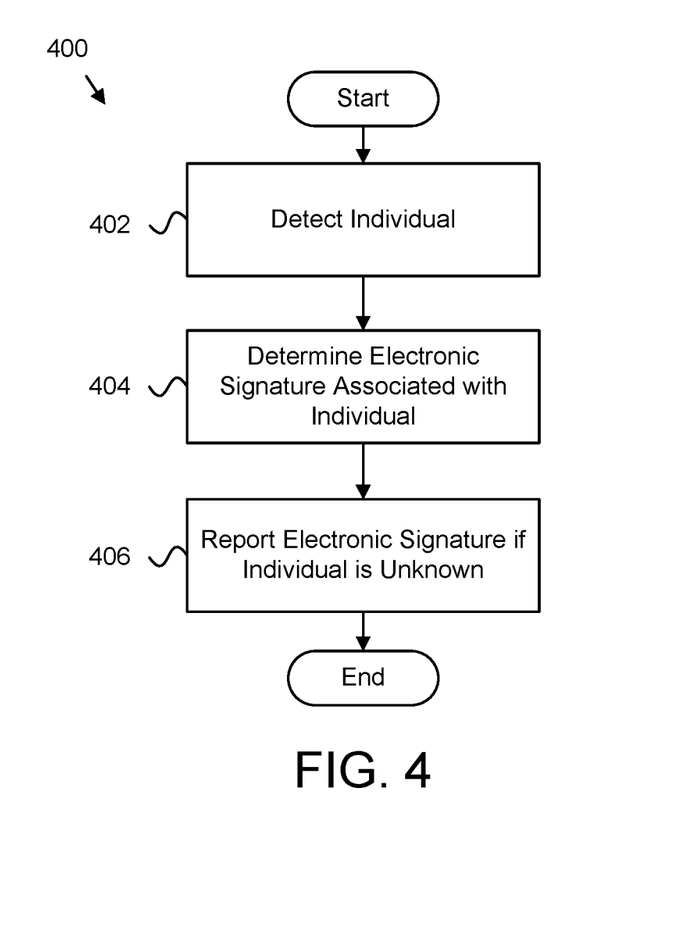
FIG. 4 is a schematic flow chart diagram illustrating one embodiment of a method for identifying an individual based on an electronic signature.

FIG. 4 is a schematic flow chart diagram illustrating one embodiment of a method 400 for identifying an individual based on an electronic signature. In one embodiment, the method 400 begins and detects 402 an individual based on input received from one or more sensors. The method 400, in a further embodiment, determines 404 an electronic signature associated with the detected individual. In some embodiments, the method 400 reports 406 the determined electronic signature in response to determining that the detected individual is an unknown individual, and the method 400 ends. In one embodiment, the individual module 202, the signature module 204, and the report module 206 performs the various steps of the method 400.

Figure 5:
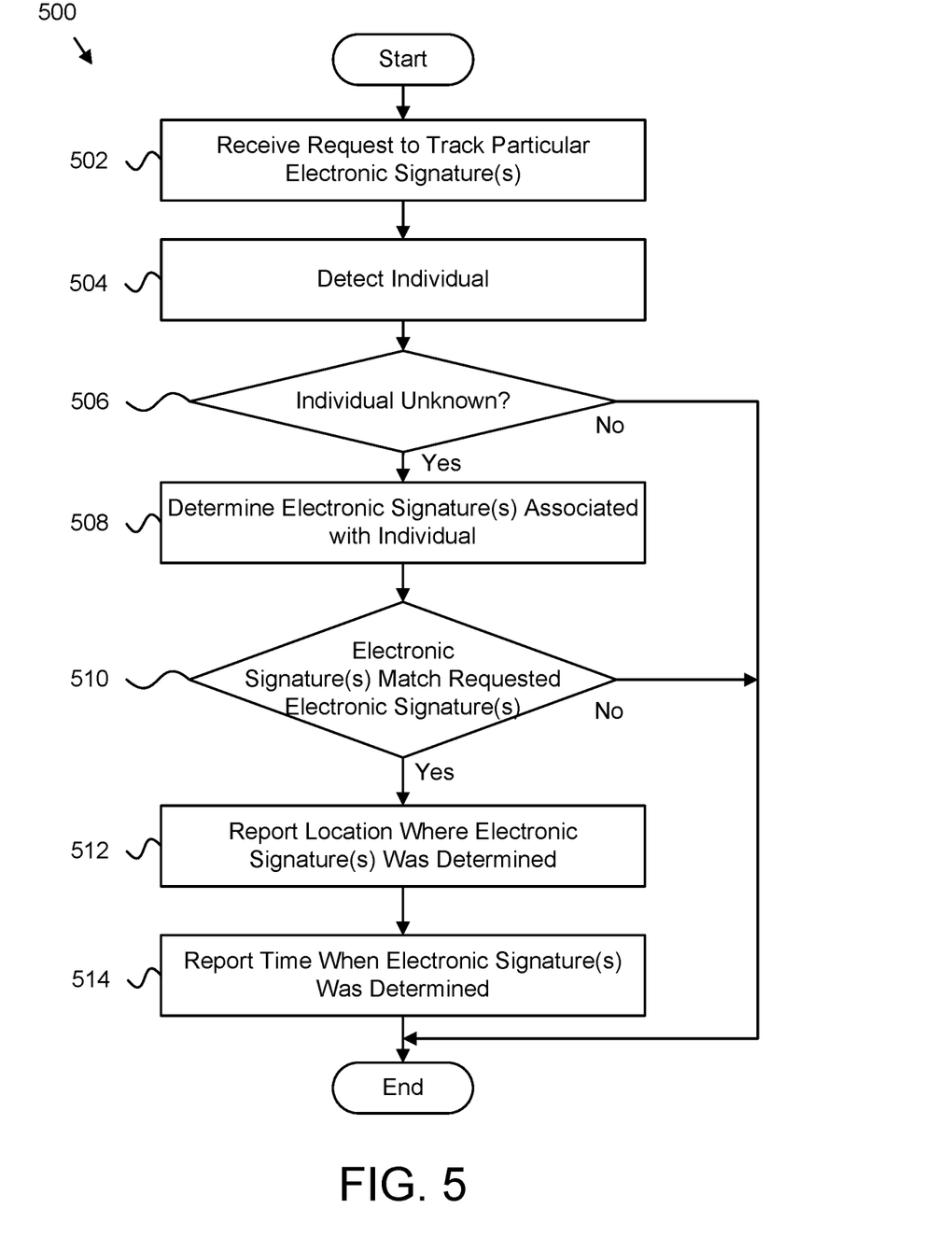
FIG. 5 is a schematic flow chart diagram illustrating one embodiment of another method for identifying an individual based on an electronic signature.

FIG. 5 is a schematic flow chart diagram illustrating one embodiment of another method 500 for identifying an individual based on an electronic signature. In one embodiment, the method 500 begins and receives 502 a request to track, locate, trace, look for, or the like one or more particular electronic signatures, which may lead to finding a particular individual. The method 500, in a further embodiment, detects 504 an individual based on input received from one or more sensors.

The method 500, in one embodiment, determines 506 whether the individual is a known or unknown individual, which may be based on facial recognition, body recognition, an electronic signature, and/or the like. For example, the method 500 may search or query a facial recognition database or the like to determine whether the individuals face matches a face in the database, which may indicate that the individual is a known or approved person. If so, the method 500 ends.

Otherwise, the method 500 determines 508 one or more electronic signatures associated with the individual, and further determines 510 whether the electronic signatures match the requested electronic signatures. If not, the method 500 ends. Otherwise, the method 500 reports 512 the location where the electronic signatures (and the unknown individual) were determined, and/or reports 514 a time when the electronic signatures were determined, and the method 500 ends. In one embodiment, the individual module 202, the signature module 204, the report module 206, and the request module 304 perform the various steps of the method 500.

Figure 6:
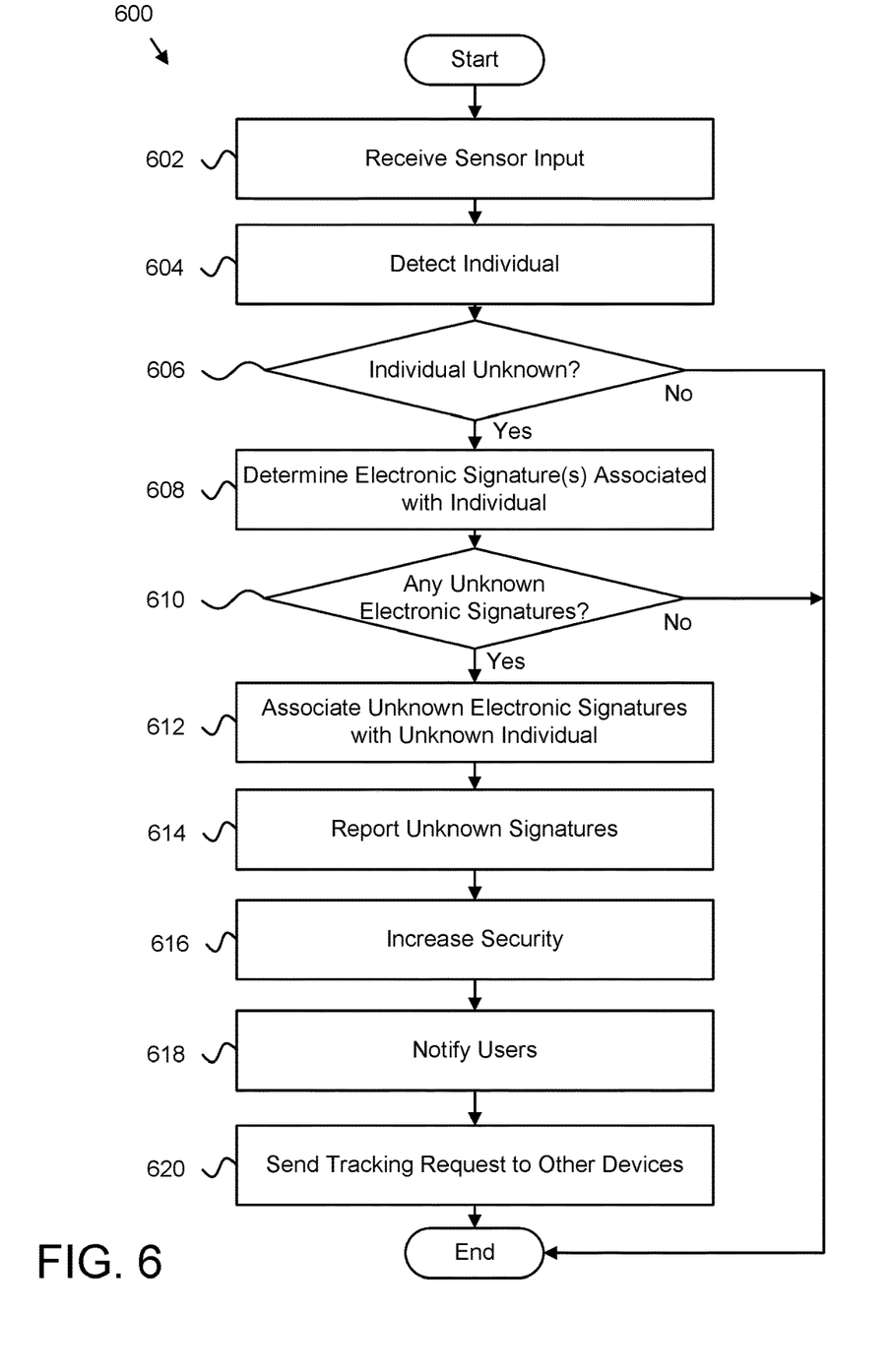
FIG. 6 is a schematic flow chart diagram illustrating one embodiment of yet another method for identifying an individual based on an electronic signature.

FIG. 6 is a schematic flow chart diagram illustrating one embodiment of another method 600 for identifying an individual based on an electronic signature. In one embodiment, the method 600 begins and receives 602 input from one or more sensors. The one or more sensors may be associated with a device, a security system, and/or the like. The method 600, in a further embodiment, detects 604 an individual based on the sensor input and determines 606 whether the individual is a known or unknown person.

If the individual is unknown, the method 600 determines 608 one or more electronic signatures associated with the individual. For example, the individual may have a tablet computer and a fitness band that are both emitting wireless signals that are detectable using one or more wireless signal sensors. The method 600, in some embodiments, determines 610 whether any of the electronic signatures are unknown. If the method 600 determines 610 that some of the electronic signatures are known, then those electronic signatures can be discarded.

However, if some are unknown, then the method 600 associates 612 the unknown electronic signatures with the unknown individual. The method 600, in some embodiments, reports 614 the unknown electronic signatures to one or more law enforcement agencies, one or more other devices/security systems, and/or the like. Furthermore, the method 600 may increase 616 the security of the location where the unknown individual was detected by performing one or more security actions such as locking doors/windows, notifying police, turning lights on, or the like.

The method 600, in certain embodiments, notifies 618 one or more users, e.g., the home owner where the unknown individual was detected, that an unknown individual was detected, and sends 620 a tracking request to one or more other devices, e.g., security systems, to continue monitoring and tracking the individual associated with the unknown electronic signatures, and the method 600 ends. In one embodiment, the individual module 202, the signature module 204, the report module 206, the notification module 302, the request module 304, and the security module 306 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
one or more sensors;
a processor;
a memory that stores code executable by the processor to:
detect an individual based on input from the one or more sensors, the one or more sensors comprising a camera;
determine an electronic signature associated with the detected individual, the electronic signature comprising a wireless signal emitted from an electronic device associated with the detected individual;
compare the determined electronic signature to a predefined list of known electronic signatures;
report the determined electronic signature to one or more remote devices in response to determining that the determined electronic signature is not on the predefined list of known electronic signatures, which indicates that the detected individual is an unknown individual;
query the one or more remote devices regarding the reported electronic signature to determine whether the one or more remote devices recognizes the reported electronic signature as being associated with a known individual; and
in response to the one or more remote devices not recognizing the reported electronic signature:
request that the one or more remote devices monitor for and further report the presence of the reported electronic signature in response to the one or more remote devices detecting the electronic signature;
perform one or more security actions to increase security where the electronic signature was detected, the one or more security actions selected from the group consisting of turning on lights, sounding an alarm, and locking entrances;
receive a location of the electronic signature from at least one of the one or more remote devices, the location comprising an address; and
report, to a law enforcement agency, the determined address, one of a picture and a video of the individual captured using the camera, and a timeframe indicating when the individual was at the determined address.

2. The apparatus of claim 1, wherein the code is further executable by the processor to detect and report a plurality of electronic signatures associated with the individual, wherein at least a portion of the plurality of electronic signatures uniquely identifies the individual.

3. The apparatus of claim 1, wherein the one or more sensors are associated with a security system, the security system performing one or more security actions in response to determining that the individual is an unknown individual.

4. The apparatus of claim 1, wherein the code is further executable by the processor to:
send a notification to a user associated with the one or more sensors; and
receive confirmation from the user that the determined electronic signature of the unknown individual is associated with a known individual.

5. The apparatus of claim 1, wherein the camera is used to capture one or more images of the individual, wherein the one or more images are used to determine one of the electronic signature of the individual and an identity of the individual.

6. The apparatus of claim 1, wherein the code is further executable by the processor to receive a request to:
detect a reported electronic signature;
determine a location for the detected electronic signature; and
report the location for the detected electronic signature.

7. The apparatus of claim 1, wherein the code is further executable by the processor to disregard the determined electronic signature in response to determining that the individual is a known individual.

8. The apparatus of claim 1, wherein the wireless signature comprises an identifier selected from the group consisting of a media access control ("MAC") address, a Bluetooth® identifier, and a device identifier.

9. A method comprising:
detecting, by a processor, an individual based on input from one or more sensors the one or more sensors comprising a camera;
determining an electronic signature associated with the detected individual, the electronic signature comprising a wireless signal emitted from an electronic device associated with the detected individual;
comparing the determined electronic signature to a predefined list of known electronic signatures;

reporting the determined electronic signature to one or more remote devices in response to determining that the determined electronic signature is not on the predefined list of known electronic signatures, which indicates that the detected individual is an unknown individual;

querying the one or more remote devices regarding the reported electronic signature to determine whether the one or more remote devices recognizes the reported electronic signature as being associated with a known individual; and in response to the one or more remote devices not recognizing the reported electronic signature:
  requesting that the one or more remote devices monitor for and further report the presence of the reported electronic signature in response to the one or more remote devices detecting the electronic signature;
  performing one or more security actions to increase security where the electronic signature was detected, the one or more security actions selected from the group consisting of turning on lights, sounding an alarm, and locking entrances;
  receiving a location of the electronic signature from at least one of the one or more remote devices, the location comprising an address; and
  reporting, to a law enforcement agency, the determined address, one of a picture and a video of the individual captured using the camera, and a timeframe indicating when the individual was at the determined address.

10. The method of claim 9, further comprising detecting and reporting a plurality of electronic signatures associated with the individual, wherein at least a portion of the plurality of electronic signatures uniquely identifies the individual.

11. The method of claim 9, further comprising receiving a request to:
  detect a reported electronic signature;
  determine a location for the detected electronic signature; and
  report the location for the detected electronic signature.

12. A program product comprising a non-transitory computer readable storage medium that stores code executable by a processor, the executable code comprising code to perform:

detecting, by a processor, an individual based on input from one or more sensors the one or more sensors comprising a camera;

determining an electronic signature associated with the detected individual, the electronic signature comprising a wireless signal emitted from an electronic device associated with the detected individual;

comparing the determined electronic signature to a predefined list of known electronic signatures;

reporting the determined electronic signature to one or more remote devices in response to determining that the determined electronic signature is not on the predefined list of known electronic signatures, which indicates that the detected individual is an unknown individual;

querying the one or more remote devices regarding the reported electronic signature to determine whether the one or more remote devices recognizes the reported electronic signature as being associated with a known individual; and in response to the one or more remote devices not recognizing the reported electronic signature:
  requesting that the one or more remote devices monitor for and further report the presence of the reported electronic signature in response to the one or more remote devices detecting the electronic signature;
  performing one or more security actions to increase security where the electronic signature was detected, the one or more security actions selected from the group consisting of turning on lights, sounding an alarm, and locking entrances;
  receiving a location of the electronic signature from at least one of the one or more remote devices, the location comprising an address; and
  reporting, to a law enforcement agency, the determined address, one of a picture and a video of the individual captured using the camera, and a timeframe indicating when the individual was at the determined address.

* * * * *